July 15, 1941.  C. DAVIS  2,249,374
SNOW VEHICLE
Filed July 5, 1939   3 Sheets-Sheet 2
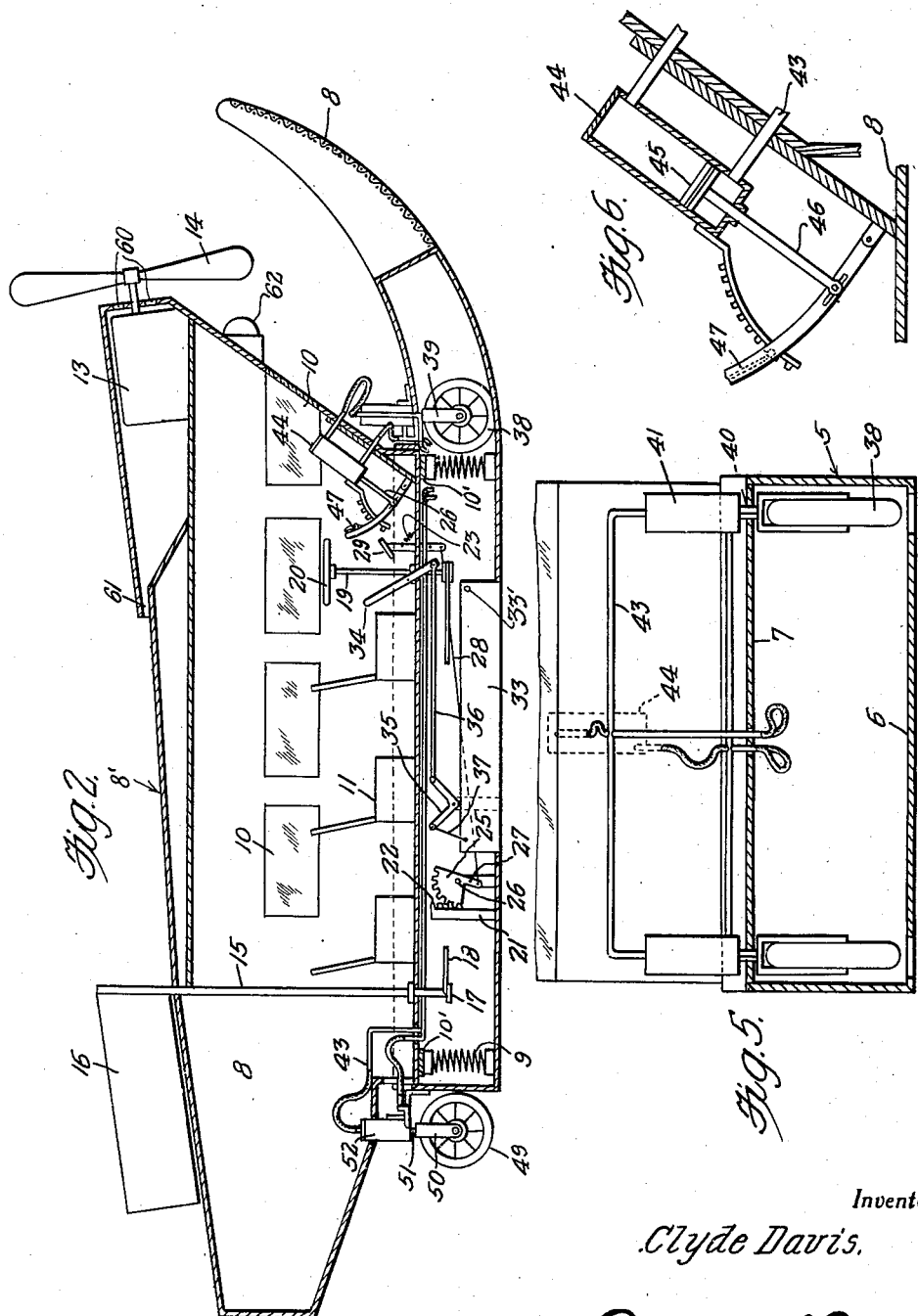
Inventor
Clyde Davis.
By Clarence A. O'Brien
and Hyman Berman
Attorneys July 15, 1941. C. DAVIS 2,249,374
SNOW VEHICLE
Filed July 5, 1939 3 Sheets-Sheet 3
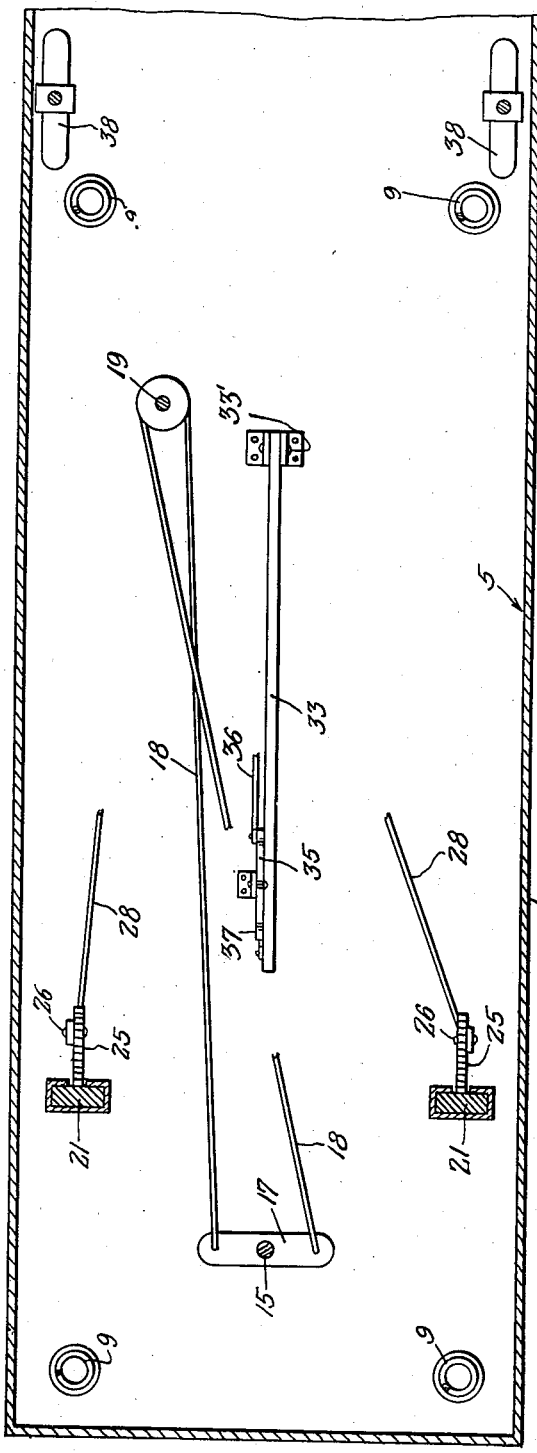
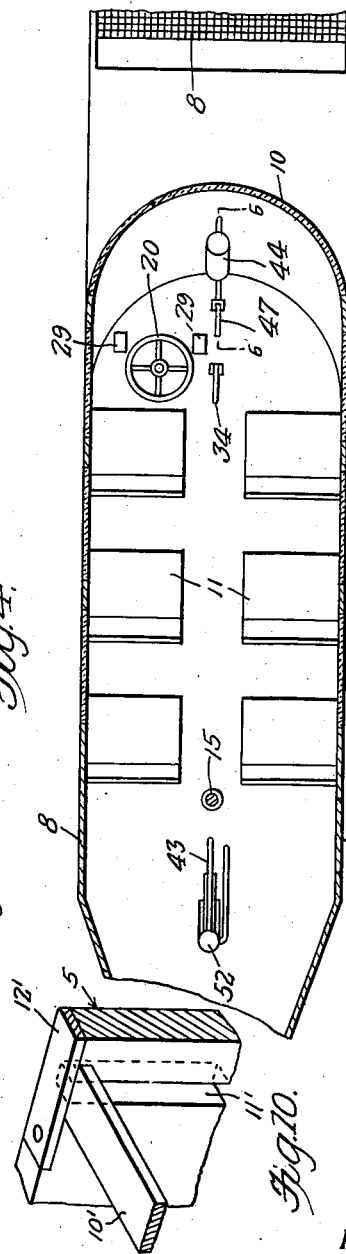
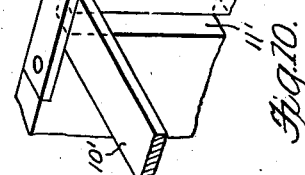
Inventor
Clyde Davis.
By Clarence A. O'Brien
and Hyman Berman
Attorneys Patented July 15, 1941

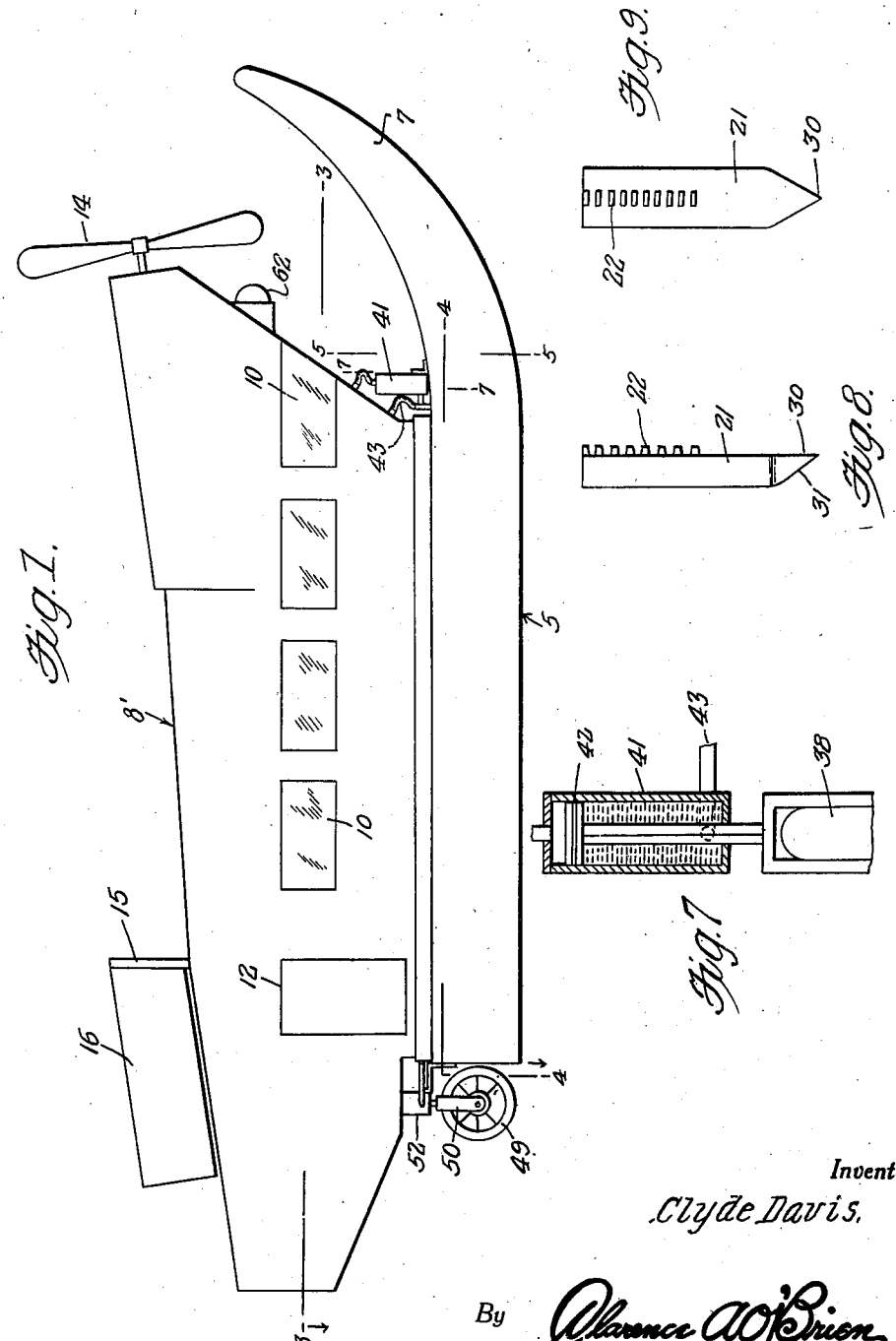

2,249,374

UNITED STATES PATENT OFFICE 2,249,374

SNOW VEHICLE

Clyde Davis, Long Lake, Wis.

Application July 5, 1939, Serial No. 282,937

3 Claims. (Cl. 180—3)

This invention relates to a snow vehicle, and has for the primary object the provision of a power driven device of this character which is capable of attaining high speeds over snow covered areas with a maximum amount of safety and is constructed to carry or accommodate a number of passengers as well as the driver with comfort and with clear vision and may be readily converted into a land vehicle whenever it is necessary to cross ground free of snow or if desired, may be employed extensively as a land vehicle.

With these and other objects in view, the invention consists in certain novel features of construction, combination and arrangement of parts to be hereinafter more fully described and claimed.

For a complete understanding of my invention, reference is to be had to the following description and accompanying drawings, in which—

Figure 1 is a side elevation illustrating a snow vehicle constructed in accordance with my invention, Figure 2 is a vertical sectional view illustrating the device.

Figure 3 is a longitudinal sectional view taken through the body of the device, taken on the line 3—3 of Figure 1.

Figure 4 is a longitudinal sectional view taken through the runner construction of the device on the line 4—4 of Figure 1.

Figure 5 is a transverse sectional view taken on the line 5—5 of Figure 1.

Figure 6 is a detail sectional view taken on the line 6—6 of Figure 3.

Figure 7 is a detail sectional view taken on the line 7—7 of Figure 1.

Figure 8 is a side elevation illustrating a brake element.

Figure 9 is a front elevation illustrating the brake element.

Figure 10 is a fragmentary perspective view illustrating the slidable connection between the runner construction and the body.

Referring in detail to the drawings, the numeral 5 indicates a sled construction which presents a comparatively broad flat runner surface 6. The runner construction at its forward end is curved upwardly, as shown at 7, to present a guard and is of skeleton formation covered with a suitable foraminous material 8 through which loose snow may pass. The sled construction 5 is of a chambered arrangement and has located therein coil springs 9 for yieldably supporting a body 8'.

The body 8' has windows 10 in the sides and front walls thereof and also has arranged therein a number of chairs or seats 11 for the accommodation of passengers and the driver of the device. It is preferable that the chairs or seats be arranged in rows with a center aisle so that the passengers may readily enter and leave the chairs or seats. A suitable entrance-way, indicated by the numeral 12, is provided in one side of the body and normally closed by a door. In the upper forward portion of the body is mounted an internal combustion engine 13 of the air cooled type and which has connected thereto a propeller 14 arranged in front of the body and rearwardly of the guard 7 so that the propeller will be protected from brush or the like when the device is traveling over snow covered areas where small brush or trees may be growing.

One of the seats or chairs is reserved for the use of the driver where the various controls of the device are located.

Cross members 10' are secured to the under face of the body 8' and have reduced ends which operate in vertically arranged guide grooves 11' formed in the vertical walls of the sled construction so that the body and sled construction may have relative movement to each other. Strips 12' close the upper end of the vertical guide grooves 11' to prevent the reduced ends of the members 10' from moving out of the guide grooves and consequently preventing entire separation of the body and runner construction.

A rudder shaft 15 is journaled vertically in the body with the lower end extending into the sled construction while the upper end terminates above the body and carries a rudder 16. A rudder arm 17 is secured intermediate its ends to the lower end of the rudder shaft and has connected thereto rudder cables 18 which are in turn connected to a steering shaft 19 including a steering wheel 20. It is preferable that the rudder cables cross each other, as shown in Figure 4, so that the rudder will be turned in the same direction as the turning of the steering wheel 20.

Brake elements 21 are slidably mounted in the sled construction for movement through the bottom wall thereof and includes rack teeth 22 meshing with segmental shaped gears 25 pivotally mounted in the runner construction, as shown at 26, and each includes an operating arm 27. Connected to the operating arms 27 are cables 28 and the cables are in turn connected to pivotally mounted foot pedals 29 which will permit the driver to bring either or both of the brake elements into engagement with the ground for the purpose of retarding the speed of the device. Suitable springs 23 may be connected to the foot pedals for elevating the brake elements from engagement with the ground. It is preferable that the brake elements have pointed ends 30 which ends also may be beveled, as shown at 31, to permit said ends to readily bite into the ground.

It is to be noted that the rudder 16 is located directly rearwardly of the propeller within the path of the air currents from the propeller so that the air currents will act on the propeller to bring about positive steering of the device in any direction at the desire of the operator.

An anti-skid board 33 is pivotally mounted at one end within the sled construction, as shown at 33', and is adapted for movement through the bottom wall of said sled construction through the operation of a control lever 34. The control lever is connected to a bell crank lever 35, as shown at 36. The bell crank lever is pivotally mounted in the sled construction and is connected to the non-skid device as shown at 37. The non-skid device may be readily raised or lowered and when lowered is adapted to engage into the snow for the purpose of preventing side slipping of the device.

The forward portion of the sled construction is equipped with front wheels 38 normally confined within the sled construction and capable of moving through slots provided in the bottom wall of said sled construction for supporting the device when using the latter over areas not covered by snow. The wheels are journaled in forked axles 39 and the stems 40 thereof extend into cylinders 41 and are provided with pistons 42. Fluid pipes 43 are connected to opposite ends of the cylinder and to a master cylinder 44 arranged within the body and in which operates a master piston 45, the stem 46 of which is pivotally connected to a control lever 47. Any suitable holding means may be provided for the lever 47 to retain the piston 45 in a selected position. When the piston 45 is moved toward one end of the master cylinder fluid will be forced to circulate into the cylinders 41 for the purpose of raising the pistons 42 and elevating the wheels within the sled construction and when the control lever 47 is moved in an opposite direction or the piston 45 moved in an opposite direction the fluid will be circulated in a reverse direction extending the wheels through the slots of the sled construction into engagement with the ground for elevating the sled construction from the ground.

A rear wheel 49 is journaled on the rear end portion of the body so as to turn freely in either direction and thereby act as a pilot wheel. The rear wheel 49 is journaled to a forked axle 50, the stem 51 of which extends into a cylinder 52 and has connected therewith a piston similar to one of the pistons 42. The cylinder 52 has the fluid pipes of the master cylinder connected thereto so that the rear wheel will be elevated or lowered in accordance with the elevation and lowering of the front wheels. The stem 51 is free to rotate in the cylinder 52 so as to permit the rear wheel 49 to pivot. However, the stems of the front wheels or the axles thereof are non-rotatable in the cylinders 42 so that the front wheels will be held against swinging in either direction. Thus it will be seen that through the manipulation of the control lever 47 the device can be readily converted either into a vehicle for snow covered areas or into a land vehicle. When the device is used either on snow or on the ground its propulsion is by the engine 13 operating the propeller 14, the steering being carried out through the operation of the rudder 16. The forward end of the body rearwardly of the propeller may be provided with vent openings 60 to allow air to enter the body for the purpose of cooling the engine. By referring to Figure 2 it will be noted that the engine is located in a separate compartment from the passengers and driver and the air passing from the engine may escape by a vent arrangement 61 provided in the roof of the body.

The body at the forward end thereof may be provided with a headlight 62 so as to give sufficient illumination of the area directly in front of the device so that the latter can be conveniently driven with safety at night.

It is believed that the foregoing description when taken in connection with the drawings will fully set forth the construction and advantages of this invention to those skilled in the art to which such device relates, so that further detailed description will not be required.

Having described the invention, what I claim is:

1. In a snow vehicle, a hollow runner body having its front end curving upwardly and said body including a lower bottom forming member, an upper top forming member and vertically arranged side and end wall forming members, the top member having an opening therein which extends to the side members and from the rear end member to a point rearwardly of the upwardly curved part of the front of the runner body, the side members having vertical slots therein located adjacent the ends of the opening, a body having its lower part of a length to fit in the opening at the top of the runner body and said body including a bottom member, cross pieces connected with the lower face of the bottom member and having reduced ends fitting in the slots in the side members of the runner body, springs in the runner body upon which the cross pieces rest and means for closing the upper ends of the slots.

2. In a snow vehicle including a hollow runner body having a longitudinally extending and centrally arranged slot in its bottom, a vertically arranged plate having its lower part fitting in the slot, means for pivotally connecting the upper front corner of the plate to the runner body and manually operated means for applying pressure to the rear end of the plate for forcing a portion of the plate through the slot to prevent sideslip of the runner body.

3. In a snow vehicle, a runner body of hollow construction, a main body supported on the runner body and having its rear portion extending beyond the rear end of the runner body, a wheel supported for rotary and vertical movement by the rear portion of the main body and in rear of the runner body, a pair of front wheels normally located in the runner body and said runner body having slots in the bottom for the passage of the front wheels, means for lowering the front wheels to project them through the slots and means for simultaneously lowering the rear wheel.

CLYDE DAVIS.